(12) United States Patent
Doweck

(10) Patent No.: US 6,385,696 B1
(45) Date of Patent: May 7, 2002

(54) EMBEDDED CACHE WITH WAY SIZE BIGGER THAN PAGE SIZE

(75) Inventor: Jack D. Doweck, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/344,757

(22) Filed: Jun. 25, 1999

(51) Int. Cl.$^7$ ............................................... G06F 12/00
(52) U.S. Cl. ......................... 711/128; 711/3; 711/137; 711/168
(58) Field of Search ................. 711/3, 127, 128, 711/137, 146, 167, 168, 125, 118; 365/63; 714/768

(56) References Cited

U.S. PATENT DOCUMENTS

| | | | |
|---|---|---|---|
| 5,353,424 A | * 10/1994 | Partovi et al. | 711/128 |
| 5,414,824 A | * 5/1995 | Grochowski | 711/3 |
| 5,450,565 A | * 9/1995 | Nadir et al. | 711/128 |
| 5,765,199 A | * 6/1998 | Chang et al. | 711/168 |
| 5,802,594 A | * 9/1998 | Wong et al. | 711/167 |
| 5,809,537 A | * 9/1998 | Itskin et al. | 711/146 |
| 5,848,428 A | * 12/1998 | Collins | 711/127 |
| 5,956,746 A | * 9/1999 | Wang | 711/137 |
| 6,038,693 A | * 3/2000 | Zhang | 714/768 |
| 6,101,577 A | * 8/2000 | Tran | 711/125 |
| 6,122,709 A | * 9/2000 | Wicki et al. | 711/118 |
| 6,188,596 B1 | * 2/2001 | Holst | 365/63 |

* cited by examiner

Primary Examiner—Matthew M. Kim
Assistant Examiner—Fred F. Tzeng
(74) Attorney, Agent, or Firm—Blakely, Sokoloff, Taylor & Zafman LLP

(57) ABSTRACT

A processor having an embedded cache memory, the cache including a tag array that is split into first and second halves each having N ways, the first half storing an upper M sets and the second half storing a lower M sets. Lower order linear address bits read the first and second halves in a first phase of a clock cycle. Compare circuitry compares each of the N ways read out of both the first and second halves of the tag array with higher order physical address bits. Select circuitry then selects one of two sets of way select signals based on a higher order linear address bit. A data array having N ways and 2M sets is accessed by the lower order linear address bits in combination with the higher order linear address bit, with the selected set of way select signals outputting data of the correct way.

22 Claims, 4 Drawing Sheets

EMBEDDED CACHE WITH WAY SIZE BIGGER THAN PAGE SIZE

FIELD OF THE INVENTION

The present invention is related to the field of cache memories: more particularly, to architectures of local cache memory embedded on the same silicon chip as a microprocessor.

BACKGROUND OF THE INVENTION

Many processors manufactured today include one or more embedded first level caches. "Cache" is the name generally given to the first level of memory storage in a memory hierarchy of a computer system. Caches operate on the principle of locality, by providing the processor with access to data that is frequently referenced. To put it another way, a cache reduces average memory access time when it is organized so that the code and the data the microprocessor needs most often is resident within the cache. The cache accomplishes this by storing code and data that the microprocessor has requested, and also storing code and data that the microprocessor is predicted to request.

In its simplest form, a cache has three basic components: a data cache array, a tag cache array, and cache management logic. Most often, the data and tag cache arrays are implemented with random access memory (RAM). The data cache RAM is a block of fast memory that stores copies of data or instructions frequently requested by the processor. Since the cache holds copies of data or instructions that are in the main system memory, it is necessary to know when a copy is available in the cache.

As information is copied into the data array, its main system memory addresses are also stored in the tag array. The tag array contains the original main system memory addresses of code or data stored in the data array, plus additional bits used by the cache management logic. As is well known, each directory entry in the tag array is called a "tag". A "block" refers to the minimal unit of information that can be present in the cache (i.e., a cache "hit") or not (i.e., a cache "miss").

There are three basic categories of cache organization. In a direct-access cache, each block has only one place that it can appear within the cache. In a fully associative cache a block can go anywhere within the cache. A set associative cache is one in which the block can be placed in a restricted set of places in the cache. A group of blocks in the cache is referred to as a set. If there are N blocks in a set, the cache is called N-way, set associative.

A majority of processor caches today are either organized as direct mapped caches, two-way set associative, or four-way set associative caches. By way of example, the Intel Pentium® processors, including the Pentium®, Pentium® Pro and Pentium® II processors include N-way set associative embedded first level caches.

One way to possibly improve performance in a new processor version is to increase the size of the first level caches. A cache can be enlarged by increasing its associativity (i.e., the number of ways), by increasing the number of sets, by increasing the cache line size, or by a combination of any of the above. There are well-known trade-offs that favor one option or another, dependent upon purpose, usage, and other considerations of the processor and memory hierarchy.

Generally speaking, however, the microarchitectures of many commercial processors—such as those that utilize the Intel Architecture (IA)—impose an upper limit of 4 Kbytes to the size of each way, apparently prohibiting any viable implementation exceeding that size. The value of 4 Kbytes may be derived from the paging architecture of these associative processors. Other problems arise when the number of ways is increased beyond four. In other words, set associative caches having eight or sixteen ways create additional problems that adversely affect overall processor performance. Therefore increasing the numbers of ways beyond four is not always considered to be a viable alternative.

Likewise, for architectural reasons it is often undesirable to increase the cache line size.

Thus, there exists a need in the microprocessor field for a novel implementation of an embedded cache with an increased way size to improve processor performance.

SUMMARY OF THE INVENTION

A cache memory is provided, which, in one embodiment, comprises a tag array that is split into first and second halves. Each of the first and second halves has N ways. The first half of the tag array is used to store upper M sets, and the second half of the tag array to store lower M sets. Lower order address bits are utilized to read both the first and second halves of the tag array in a first phase of a clock cycle. Comparison circuitry is coupled to the first and second halves of the tag array. The comparison circuitry compares each of the N ways read out of both the first and second halves of the tag array with higher order physical address bits. The output of the comparison circuitry is coupled to select circuitry to select a set of way select signals. This selection is based on at least one bit of the higher order address bits.

The cache memory also includes a data array having N ways and 2M sets. The lower order address bits, in combination with the at least one bit, is used to access the data array. The set of way select signals outputs data of a correct way.

DESCRIPTION OF THE DRAWINGS

The present invention will be understood more fully from the detailed description which follows and from the accompanying drawings, which however, should not be taken to limit the invention to the specific embodiments shown, but are for explanation and understanding only.

FIG. 3 corresponds to the embodiment of FIG. 2, while FIG. 4 corresponds to the embodiment of FIG. 5.

DESCRIPTION

An apparatus to implement an embedded cache with way size bigger than page size is described. In the following description numerous specific details are set forth, such as line sizes, signals, logic circuits, architectures, etc., in order to provide a thorough understanding of the present invention. However, many of these specific details may not be needed to practice the present invention.

Figure 1:
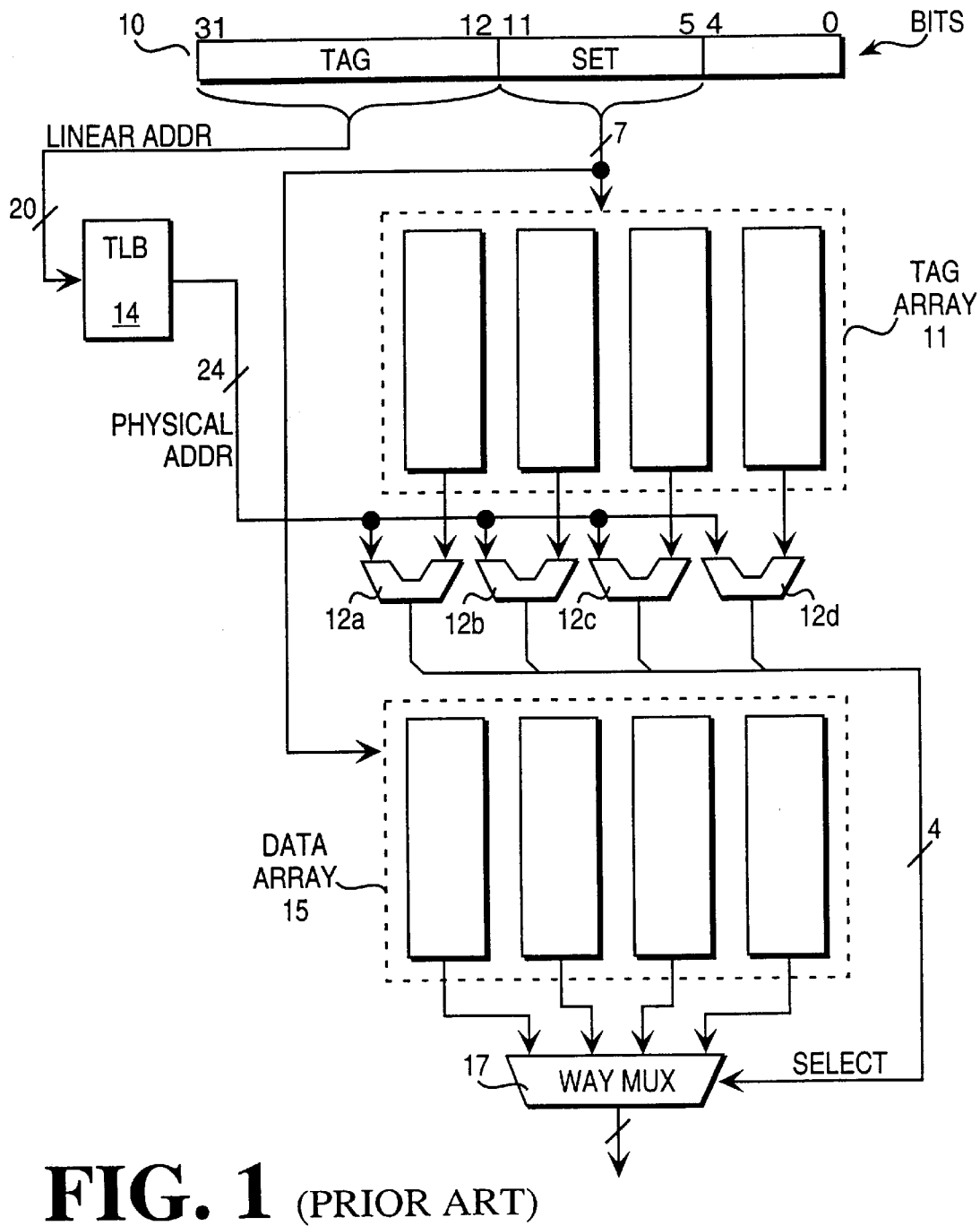
FIG. 1 illustrates a prior art embedded cache memory.

Referring to FIG. 1 there is shown a first level cache having an organization typical of the aforementioned Pentium® processor family in which a 32-bit address 10 is used to read data out of the cache. A look-up to the first level cache of FIG. 1 involves decoding the seven "set" address bits A[11:5] to access tag array 11. In the embodiment shown, the cache is organized as a 4-way set associative cache memory so that the 7-bit set address accesses each of the four tag arrays (one for each way). Note that in FIGS. 1–6 the decoder logic associated with the tag and data arrays is not shown to avoid obscuring the invention in unnecessary detail.

Concurrently, the 20-bit higher order linear address bits A[31:12] are translated utilizing an ordinary translation look-aside buffer (TLB) 14. The TLB 14 produces the physical address corresponding to the linear address presented at its input. This physical address is compared to each of the four different tags outputted by tag array 11 to determine if there has been a hit to the cache; and if so, which way. In FIG. 1 the comparison is shown being performed by comparators 12a–12d, which produce a set of way select signals that is sent to way multiplexer 17 associated with data array 15.

At the same time that the lower order linear address bits are accessing tag array 11, these same address bits A[11:5] also are decoded for accessing the four ways of data array 15. Once the four ways of data have been read out of data array 15, way multiplexer 17 selects which of the four ways is the correct way based upon the tag comparison results provided on the way select line.

In order to save clock cycle time and to speed up the cache operations, the translation of the page linear address (twenty most significant bits of the linear address) is usually performed concurrently with the reading of the tag array by the lower order address bits. However, one of the problems that arises when increasing the way size beyond 4 Kbytes is that one or more bits of the physical page address is required before the physical tags can be read from the tag array. This means that the TLB operation and the reading of the tag array cannot be executed concurrently; rather, they must be executed successively, one after the other. This is a serious drawback, as waiting for the physical page address to be computed obviously has an adverse impact on processor performance. For this reason, increasing the way size beyond 4 Kbytes is a widely disfavored approach.

Figure 2:
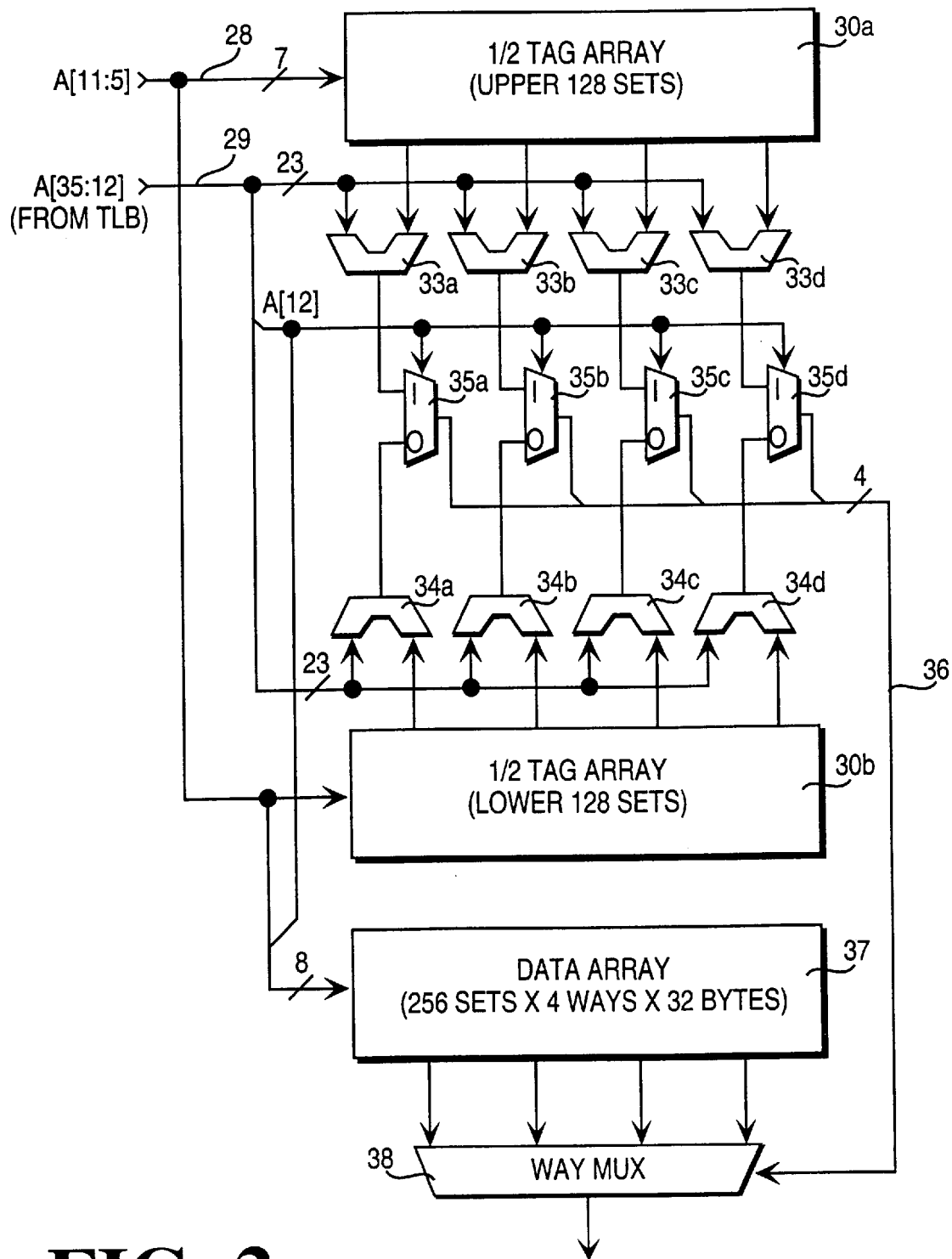
FIG. 2 is a block diagram of the cache memory architecture according to one embodiment of the present invention.

To overcome this problem, the present invention provides a cache memory architecture having a way size bigger than the page size. FIG. 2 illustrates the cache organization for one embodiment of the present invention. External to the processor the cache appears as if it is a 4-way, 256 set associative cache. Internally, however, it is divided into two portions, each portion having 128 sets. This is shown in FIG. 2 where the tag array is split into upper and lower 128-set portions, denoted by the reference numerals 30a and 30b, respectively. In other words, the 256 sets are implemented by two separate tag arrays 30a and 30b, each of 128 sets.

The upper tag array 30a contains tags for which bit 12 of the address A[12] is high (=1). Lower tag array portion 30b contains tags for which bit A[12] is low (=0). The untranslated lower order linear address bits A[11:5] are provided concurrently to both the upper and lower tag arrays 30a and 30b. This allows both portions of the array to be read in the first phase of the processor clock cycle (see FIGS. 3 and 4).

When a cache look-up is performed, and both portions of the tag array are read simultaneously, a comparison with the translated higher order physical address bits A[35:13] takes place for both halves 30a and 30b. Note that bit A[12] does not need to be compared since it is known to be "1" in the upper array and "0" in the lower array. In FIG. 2, the lower order untranslated linear address bits are provided on line 28 to both tag array portions 30a and 30b. The translated higher order physical address bits are provided on line 29 to comparators 33a–33d associated with upper tag array 30a, and also to comparators 34a–34d, associated with lower tag array 30b. The outputs of each of the comparators 33 and 34 are coupled to the input of corresponding multiplexors 35. For example, comparators 33a and 34a each provide outputs coupled to the two inputs of multiplexer 35a, comparators 33b and 34b provide outputs coupled to the inputs of multiplexer 35b, and so on.

It is appreciated that the translation of the linear address is completed around the same time the tag array read is performed. This allows address bit A[12] to be used as a select signal coupled to each of multiplexors 35a–35d. The translated address bit A[12] determines whether the tag read out is to be obtained from the upper or lower portion of the tag array. By way of example, if A[12] is high the upper tag array 30a is selected to provide the way select signals on line 36 coupled to way multiplexer 38 associated with data array 37. For purposes of the present application, the way multiplexer 38 maybe considered to be integral with the data array section of the cache.

It should be understood that the tag array look up is performed concurrently on the upper and lower halves of the tag arrays regardless of the actual value of A[12]. At the same time, the higher order portion of the address, which includes A[12], is translated by the TLB (not shown in FIG. 2).

Once the translation and the tag array look-up have both been completed, the comparison may take place to generate way select signals 36. The way select signals point to the correct way containing the required data in data array 37. Recall that address bit A[12] is used to select one of two sets of way select signals that are then sent to way multiplexer 38 associated with data array 37.

Figure 3:
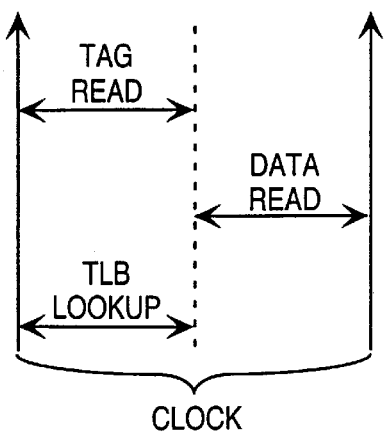
FIGS. 3 & 4 illustrate timing relationships of operations that take place in different embodiments of the present invention.

FIG. 3 shows an implementation in which the data array 37 is read in the second phase of the processor clock cycle. In such an implementation, the translated A[12] bit is combined with the untranslated lower order address bits to read the data for all four ways out of array 37.

Figure 4:
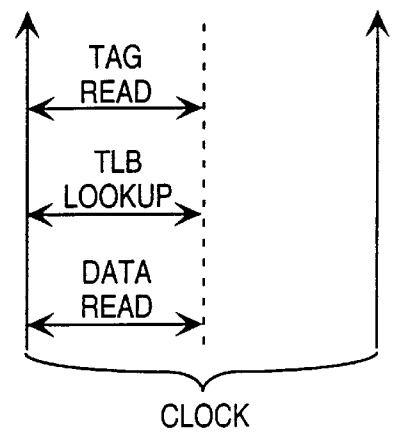
Figure 5:
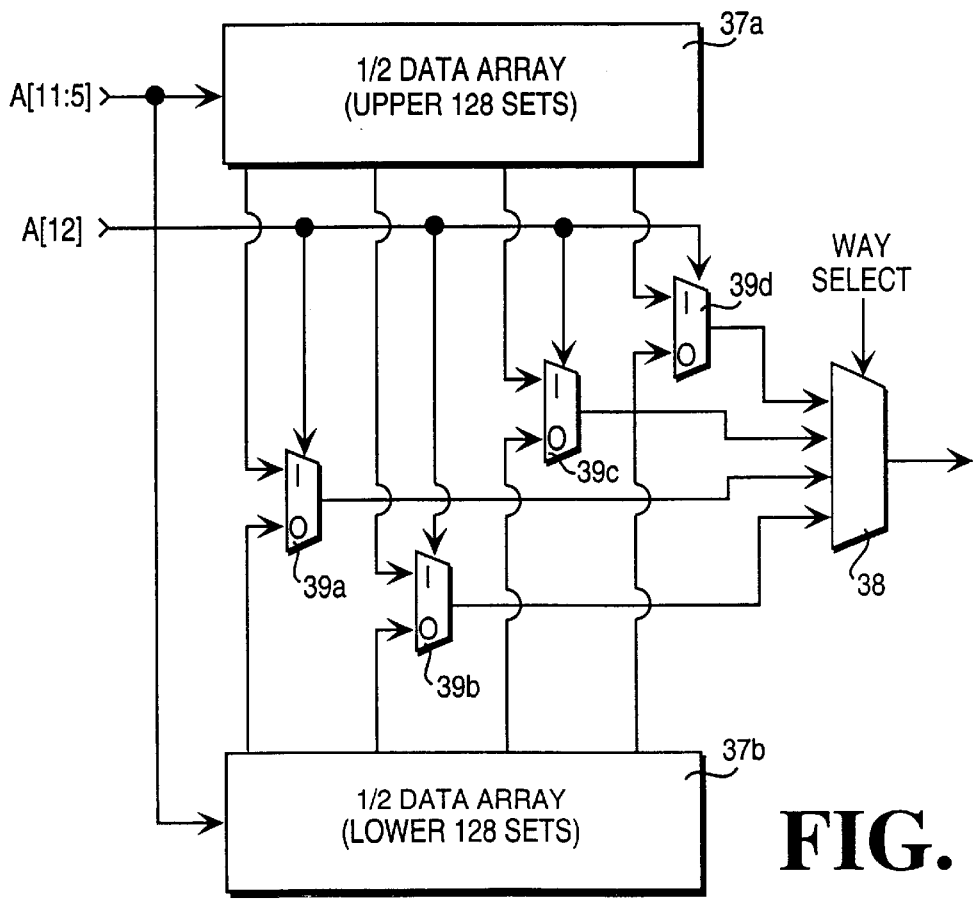
FIG. 5 shows an alternative embodiment of the data array section of the cache memory.

FIG. 4 shows a different implementation in which all operations—tag read, TLB look-up, and data read, all occur within the first phase of a clock cycle of the processor. In such a case, the data array should be read at the same time as the tag array. FIG. 5 illustrates how this result may be achieved by splitting the data array in the same manner as described above for the tag arrays.

In FIG. 5, the data array is shown being split into upper and lower portions, 37a and 37b, respectively each comprising 128 sets. Upper portion 37a provides the upper 128 sets of data, while lower portion 37b provides the lower 128 sets in response to the lower order linear address bits. Thus, both halves of the data array are read simultaneously, with the 4-way result being provided to multiplexers 39a–39d. As in the embodiment of FIG. 2, address bit A[12] is used to select either the upper or lower half of the data array to provide the correct result. The outputs of each of multiplexors 39 is coupled to way multiplexer 38, which is controlled by the way select signals output from the tag array section of the cache.

Practitioners in the art will appreciate that in the embodiment represented by FIG. 5, tag read, TLB look-up, and data read operations may occur within the first phase of the clock cycle, as shown in FIG. 4. The address bit A[12] arrives late in the first phase of the clock cycle to control multiplexors 39 that select between the upper and lower half of both the tag and data arrays. Once selected, the four lines output by multiplexer 39 are provided as inputs to way multiplexer 38.

Figure 6:
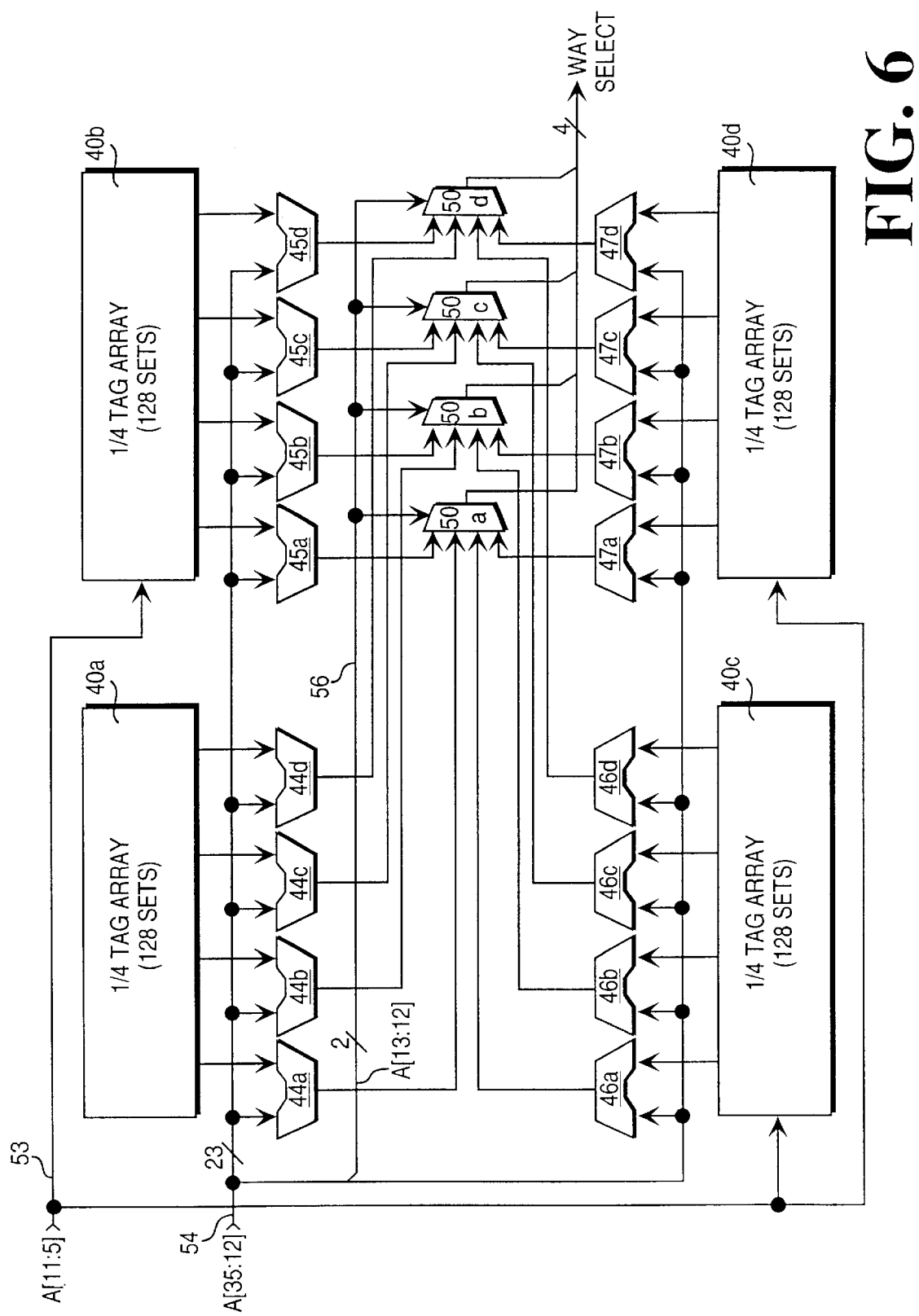
FIG. 6 is a block diagram of the cache memory architecture according to an alternative embodiment of the present invention.

FIG. 6 illustrates a further extension of the concept of the present invention to 512 sets. In this embodiment, the tag array is split into four tag array portions 40a–40d, each providing 128 sets (four ways). The embodiment of FIG. 6 also includes four sets of comparator circuits 44–47. For instance, tag array portion 40a is associated with comparators 44a–44d, tag array portion 40b is associated with comparators 45a–45d, tag array portion 40c has associated comparators 46–46d, and tag array portion 40d provides outputs to comparators to 47a–47d. The second input to each of the comparators 44–47 is provided by the output of the TLB, representing the physical address bits A[35:14] provided on line 54. The untranslated lower order linear address bits A[11:5] are provided on line 53 to each of the tag array portions.

In this embodiment, two address bits A[13:12] are provided on line 56 as a select control signal to multiplexers 50a–50d. These two address bits select one of the four tag array portions to provide the correct set of way select signals to be sent to the data array. In the same manner as described above, the set of way select signals output from multiplexers 58a–58d controls the way multiplexer to output data of the correct way.

I claim:

1. A cache memory comprising:
   a tag array split into first and second halves each having N ways, the first half of the tag array to store an upper M sets and the second half of the tag array to store a lower M sets, lower order address bits reading the first and second halves in a first phase of a clock cycle;
   compare circuitry coupled to the first and second halves of the tag array to compare each of the N ways read out of both the first and second halves with higher order address bits;
   select circuitry coupled to the compare circuitry to select a set of way select signals based on at least one bit of the higher order address bits; and
   a data array having N ways and 2M sets, the lower order address bits, in combination with the at least one bit, being used to access the data array, the set of way select signals outputting data of a correct way.

2. The cache memory of claim 1 wherein N=4.
3. The cache memory of claim 1 wherein M=128.
4. The cache memory of claim 1 wherein the lower order address bits comprise linear address bits.
5. The cache memory of claim 4 wherein the lower order linear address bits comprise bits A[11:5].
6. The cache memory of claim 1 wherein the higher order address bits comprise physical address bits.
7. The cache memory of claim 1 wherein the higher order physical address bits comprise bits A[35:12].
8. The cache memory of claim 1 wherein the data array is accessed in a second phase of the clock cycle.
9. The cache memory of claim 1 wherein the data array is split into first and second halves, the first half of the data array to store an upper M sets of data and the second half of the data array to store a lower M sets of data, the lower order address bits accessing the first and second halves of the data array in the first phase of a clock cycle;
   multiplexer circuitry coupled to the first and second halves of the data array, the at least one bit of the higher order address bits selecting data from either the upper M sets or the lower M sets, with the set of way select signals circuitry being coupled to the multiplexer circuitry to output data of the correct way.

10. A cache memory comprising:
    a translation look-aside buffer to store translations of linear addresses into corresponding physical addresses;
    an embedded cache memory, which includes:
    a tag array split into first and second halves each having N ways, the first half of the tag array to store an upper M sets and the second half of the tag array to store a lower M sets, lower order linear address bits reading the first and second halves in a first phase of a clock cycle;
    compare circuitry coupled to the first and second halves of the tag array to compare each of the N ways read out of both the first and second halves with higher order physical address bits;
    select circuitry coupled to the compare circuitry to select a set of way select signals based on a higher order linear address bit; and
    a data array having N ways and 2M sets, the lower order linear address bits, in combination with the higher order linear address bit, being used to access the data array, the set of way select signals outputting data of a correct way.

11. The processor of claim 10 wherein N=4.
12. The processor of claim 10 wherein M=128.
13. The processor of claim 10 wherein the lower order linear address bits comprise bits A[11:5].
14. The processor of claim 10 wherein the higher order physical address bits comprise bits A[35:12].
15. The processor of claim 10 wherein the data array is accessed in a second phase of the clock cycle.
16. The processor of claim 10 wherein the data array is split into first and second halves, the first half of the data array to store an upper M sets of data and the second half of the data array to store a lower M sets of data, the lower order physical address bits accessing the first and second halves of the data array in the first phase of a clock cycle;
    multiplexer circuitry coupled to the first and second halves of the data array, the higher order linear address bit selecting N ways of data accessed from either the first or second half of the data array, the set of way select signals being coupled to the multiplexer circuitry to output data of the correct way.

17. A cache memory comprising:
    a tag array split into first, second, third and fourth portions each having N ways and each storing M sets, lower order linear address bits reading the first, second, third and fourth portions in a first phase of a clock cycle;
    compare circuitry coupled to the first, second, third and fourth portions of the tag array to compare each of the N ways read out of the first, second, third and fourth portions with higher order physical address bits;
    select circuitry coupled to the compare circuitry to select a set of way select signals based on a pair of bits of the higher order physical address bits; and
    a data array having N ways and 4M sets, the lower order linear address bits, in combination with the pair of bits, being used to access the data array, the set of way select signals outputting data of a correct way.

18. The cache memory of claim 17 wherein N=4.

19. The cache memory of claim 17 wherein M=128.

20. The cache memory of claim 17 wherein the lower order linear address bits comprise bits A[11:5].

21. The cache memory of claim 17 wherein the higher order physical address bits comprise bits A[35:12].

22. The processor of claim 17 wherein the data array is accessed in a second phase of the clock cycle.

* * * * *

UNITED STATES PATENT AND TRADEMARK OFFICE
CERTIFICATE OF CORRECTION

PATENT NO. : 6,385,696 B1
DATED : May 7, 2002
INVENTOR(S) : Doweck et al.

It is certified that error appears in the above-identified patent and that said Letters Patent is hereby corrected as shown below:

Column 2,
Line 60, delete "DESCRIPTION" and insert -- DETAILED DESCRIPTION --.

Column 3,
Line 49, delete "cache organization for" and insert -- cache architecture for --.

Column 4,
Line 54, delete "respectively each" and insert -- respectively, each --.

Column 5,
Line 21, delete "portions." and insert -- portions 40a - 40d. --.

Signed and Sealed this

Twelfth Day of November, 2002

*Attest:*

*Attesting Officer*

JAMES E. ROGAN
*Director of the United States Patent and Trademark Office*